United States Patent Office 3,398,157
Patented Aug. 20, 1968

3,398,157
PROCESS FOR PREPARING BENZIMIDAZOLE N-OXIDES
John M. Chemerda, Plainfield, George Gal, Summit, and Meyer Sletzinger, North Plainfield, N.J., assignors to Merck & Co., Inc., Rahway, N.J., a corporation of New Jersey
No Drawing. Continuation-in-part of application Ser. No. 422,489, Dec. 31, 1964. This application May 25, 1967, Ser. No. 641,120
4 Claims. (Cl. 260—302)

ABSTRACT OF THE DISCLOSURE

Benzimidazole-1-oxides substituted at the 2-position with a heteroaromatic radical having 1–3 hetero atoms wherein the hetero atoms are oxygen, nitrogen and/or sulfur, with optional substitution at the 5- and 6- positions. A process for the preparation of novel benzimidazole-1-oxides which are anthelmintic agents. Anthelmintic compositions containing a benzimidazole-1-oxide as the active ingredient.

CROSS REFERENCES TO RELATED APPLICATIONS

This application is a continuation-in-part of our co-pending application Ser. No. 422,489, filed Dec. 31, 1964 and now abandoned.

DESCRIPTION OF THE INVENTION

This invention relates generally to new chemical compounds. More particularly, it relates to derivatives of heterocyclic compounds. Still more specifically it is concerned with benzimidazoles which have an oxygen atom attached at the 1-position thereof. It is concerned further with the methods of making such compounds. It is also concerned with the use of such compounds and compositions containing them in the treatment and prevention of helminthiasis.

The infection known as helminthiasis involves infestation with various species of parasitic worms of the animal body, particularly the gastrointestinal tract. It is a common, widespread and serious disease, methods for the treatment and prevention of which have not been entirely satisfactory. It is one object of the present invention to provide novel compounds. It is a further object to provide methods of synthesizing such compounds. It is a still further object of this invention to provide a method for preparing anthelmintic compositions containing such compounds. It is another object of this invention to provide a group of substituted benzimidazole-1-oxides which are effective in controlling helminthiasis. Other objects will become apparent from the following description of the invention.

It should be understood that when reference is made in the specification and claims to a "benzimidazole-1-oxide," that such term includes within its meaning and scope the tautomeric form thereof or the corresponding 1-hydroxy benzimidazole.

Among the helmintic parasites, the nematodes of the genera Haemonchus, Trichostrongylus, Ostertagia, Nematodirus, Cooperia, Bunostomum, Oesophagostomum, Chabertia, Trichuris, Ascaris, Capillaria, Heterakis and Ancylostoma are the most common parasites of domestic animals. The disease attributable to such infections, such as ascariasis, trichostrongylosis and gross parasitism, are very widespread and serious, the diseased host usually suffering from such condition as malnutrition, anemia and hemorrhaging. Moreover, more advanced and uncontrolled cases of helminthiasis can lead to prostration and death.

According to the instant invention, it has now been found that certain benzimidazole-1-oxides substituted at the 2-position with a heteroaromatic group containing nitrogen, oxygen and/or sulfur as a hetero atom also having at the 5- or 6-position hydrogen or an alkyl or loweralkoxy radical have anthelmintic activity.

These compounds are also useful as intermediates in preparing the corresponding 1-loweralkoxy benzimidazoles. This preparation involves treating a benzimidazole-1-oxide in an inert organic solvent with a strong base such as sodium hydroxide and a lower alkylating agent such as methyl iodide.

The new and novel compounds within the scope of this invention may be represented by the formula

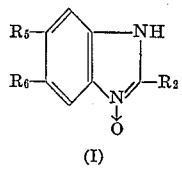

(I)

where $R_2$ is a heteroaromatic radical containing from 1–3 hetero atoms, wherein the hetero atoms are nitrogen, oxygen, or sulfur, such as thienyl, furyl, pyrryl, or thiazolyl. The preferred compounds of the invention are those wherein the 2-substituent contains nitrogen and sulfur as hetero atoms, e.g., thiazolyl. $R_5$ and $R_6$ are hydrogen or one of $R_5$ and $R_6$ is alkyl, preferably loweralkyl such as methyl, ethyl, isopropyl and the like, or a loweralkoxy group such as methoxy, ethoxy, or propoxy.

As illustrative of the novel benzimidazole-1-oxides falling within the scope of our invention and which may be prepared according to the methods described hereinbelow, there may be mentioned 2-(4'-thiazolyl)-benzimidazole-1-oxide, 2-(2'-furyl) - 5 - methyl - benzimidazole - 1 - oxide, 2-(2'-thienyl)-benzimidazole-1-oxide, 2-(2' - pyrryl)-benzimidazole-1-oxide, 2-(4'-thiazolyl)-6-ethyl-benzimidazole-1 - oxide, 2-(2'-pyrryl)-5-methoxy-benzimidazole-1-oxide, 2 - (2'-thiazolyl)-benzimidazole-1-oxide, 2-(3'-thienyl)-5-methyl-benzimidazole-1-oxide, 2-(4'-thiazolyl)-6 - ethoxy-benzimidazole - 1 - oxide, 2-(4'-thiazolyl)-5-methyl-benzimidazole-1-oxide and the like.

In accordance with an additional aspect of this invention, it has now been found that the compounds of Formula I may be prepared from an o-nitroanilide by treating said nitroanilide with a reducing agent in accordance with the process depicted generally in the following flow diagram:

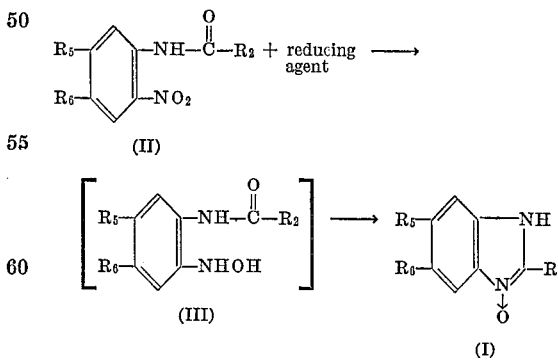

$R_2$, $R_5$ and $R_6$ are as earlier defined. As will be seen from the above diagram, the benzimidazole-1-oxides described above are obtained from the corresponding hydroxylamines (III). The reduction is carried out in a heterogeneous system containing both water and an organic solvent immiscible in water. The nitroanilide is added to a water immiscible organic solvent, for example a hydrocarbon solvent such as benzene, toluene, and xylene, or a halocarbon solvent such as methylene chloride, chloroform, carbon tetrachloride, and the like. It is desirable that the reducing agents useful in the process be both water soluble and of such activity as to avoid reduction of the nitro substituent all the way to the amine. Reducing agents particularly suited to the above process are water soluble metal hydrosulfides, for example, ammonium hydrosulfide or an alkali metal hydrosulfide such as sodium hydrosulfide or potassium hydrosulfide, and the like.

The reaction is preferably carried out at such temperatures as will minimize reduction of the hydroxylamino group on the compounds of Formula III. Temperatures under about 30° C. are preferred and reaction temperatures from about 0° C. to about 25° C. are particularly satisfactory for this purpose.

The two-phase system employed in this invention allows the hydroxylamine formed from the more insoluble nitrocarboxamide to dissolve and cyclize in the organic layer. Such a system prevents any prolonged contact between the hydroxylamine and the reducing agent and any appreciable reduction to the amine. In order to increase the rate of the reaction, it is preferred that an emulsifying agent be added to the reaction mixture. It has been found that calcium halides such as calcium chloride and calcium bromide and barium halides such as barium bromide and barium chloride are particularly suited for this purpose. The addition of an emulsifying agent exposes a greater surface area to the water solution of the reducing agent and thus allows the hydroxylamine once formed to cyclize in the organic layer with only minimum contact with the reducing agent.

In order to recover the cyclized N-oxide, the emulsion can be broken by addition of an inorganic salt such as ammonium chloride, an inorganic acid such as hydrochloric acid or an organic acid such as acetic acid or propionic acid. The N-oxide formed is generally insoluble and is filtered off and washed well with water and the organic solvent employed in the reaction. The crude product can then be purified by recrystallization from a suitable solvent, such as methanol or ethanol, or it can be dissolved in water by the addition of an inorganic acid such as hydrochloric acid, followed by filtration to remove any insoluble impurities. The benzimidazole-1-oxide is regenerated from the soluble acid salt upon neutralization with an inorganic base such as ammonium hydroxide or sodium hydroxide or an organic base such as dimethylamine or trimethylamine. The crystalline product thus obtained is collected by filtration and can be purified by techniques known in the art.

The substituted benzimidazole-1-oxides of Formula I as described hereinabove are useful in the treatment and/or prevention of helminthiasis in domesticated animals. For this purpose they may be administered orally with an ingestible carrier as a component of the animal feed stuff, in the drinking water, in salt blocks, and in unit dosage forms such as boluses and drenches. The amount of active ingredient required for optimum control of helminthiasis, of course, varies in accordance with such factors as the particular compound employed, the species of animal to be treated, the species of infecting parasite, the severity of infection, and whether the compound is employed therapeutically or prophylactically. Generally, certain classes of the compounds depicted by Formula I have activities differing from those in other classes. For instance, the benzimidazole-1-oxides having a thiazolyl substituent at the 2-position generally exhibit greater activity than those benzimidazole-1-oxides having other substituents at the 2-position. In general, however, the compounds defined by Formula I, when administered orally to domestic animals in daily doses of from about 0.1 mg. to about 500 mg. per kilogram of animal body weight are highly effective in controlling helminthiasis without intolerable toxic effect. When these compounds are to be employed as therapeutic agents, good results are obtained when the animals are fed a daily dose of from about 5 mg. to about 500 mg. and preferably 15 mg. to 250 mg. per kilogram of body weight.

Administration may be in a single dose or divided into a plurality of smaller doses over a period of 24 hours. Where prophylactic treatment is desired and the compounds are fed continuously, satisfactory results are obtained when the animal's ingest daily dosages are from about 0.1 mg. to 100 mg. per kilogram of body weight. The unit dosage forms may be readily prepared by conventional formulating techniques and are particularly useful when administration is to be made in a single dose or divided doses over a period of 24 hours.

The exact amount of active ingredient to be employed in the above compositions may vary provided that a sufficient amount is ingested to give the required dosage. In general, tablets, boluses and drenches containing from about 5 to 70% by weight of active ingredient may be satisfactorily employed to supply the desired dosage. A typical example of a bolus which may be used in accordance with the teaching of the invention is as follows:

|  | Grams |
|---|---|
| 2-(4'-thiazolyl)-benzimidazole-1-oxide | 6.0 |
| Dicalcium phosphate | 1.0 |
| Starch | 0.7 |
| Guar gum | 0.16 |
| Talc | 0.11 |
| Magnesium stearate | 0.028 |

The benzimidazole-1-oxides defined by Formula I above may be administered, dispersed in or admixed with the normal elements of animal sustenance, i.e., the feed, drinking water or other liquids normally partaken by the animals. This method is preferred when it is desired to administer the active compounds continuously, either as a therapeutic or prophylactic agent, for a period of several days or more. However, in such usage, it is to be understood that the present invention also contemplates the employment of compositions containing the active compounds intimately dispersed in or admixed with any other carrier or diluent which is inert with respect to the active ingredient, orally administrable and is tolerated by the animals.

When the compounds described according to Formula I above are provided as a constituent of the feed, the required dosage may be supplied with feed compositions containing from about 0.001%–3% by weight of the active compound. Such medicated feed compositions can be prepared for direct use by mixing the above amount of active ingredient directly with the feed. The medicated feeds may also be prepared by the use of feed supplements containing a higher concentration of the active ingredient uniformly dispersed in a solid edible carrier such as corn meal, wheat shorts, alfalfa, etc. In general, feed supplements containing from about 5% to about 50% by weight of active ingredient may be satisfactorily employed to supply the desired dosage in the finished feed.

Examples of typical feed supplements containing the active compounds dispersed in a solid inert carrier are:

| (A) | Pounds |
|---|---|
| 2-(4'-thiazolyl)-benzimidazole-1-oxide | 5 |
| Wheat shorts | 95 |

| (B) | |
|---|---|
| 2-(2'-thiazolyl)-benzimidazole-1-oxide | 15 |
| Ground oyster shells | 40 |
| Citrus meal | 45 |

| (C) | |
|---|---|
| 2-(2'-furyl)-benzimidazole-1-oxide | 25 |
| Corn meal | 75 |

| (D) | |
|---|---|
| 2-(2'-thienyl)-5-methyl-benzimidazole-1-oxide | 30 |
| Soybean mill feed | 70 |

In the preparation of these and similar feed supplements, the active ingredient is added to the carrier and the whole

Example 1.—2-(4'-thiazolyl)-benzimidazole-1-oxide

To a solution of 24.92 grams of N-(o-nitrophenyl)-thiazole-4-carboxamide in 350 ml. of methylene chloride is added 27.6 grams of sodium hydrosulfide dihydrate in 200 ml. of water over 2 hours at 5° C. Calcium chloride (10.0 grams) in 20 ml. of water is then added and the mixture is stirred vigorously at 5° C. for 6 hours and at room temperature for 18 hours. After addition of 10 grams of ammonium chloride and one hour of stirring, the solid is filtered and washed with water. It is then dissolved in 200 ml. of water by addition of 10% hydrochloric acid until pH 1.2 is achieved. Insoluble impurities are filtered off and the pH of the clear filtrate is adjusted to pH 7 by addition of 6 N ammonium hydroxide. The precipitate is filtered, washed with water and dried in vacuo. Substantially pure 2-(4'-thiazolyl)-benzimidazole-1-oxide is obtained by recrystallization of the crude material from ethanol; M.P. 237–238° C.

When N-(2-nitrophenyl)furan-2-carboxamide or N-(o-nitrophenyl)-thiazole-2-carboxamide is used in place of N-(o-nitrophenyl)-thiazole-4-carboxamide in the above process, there is obtained 2-(2'-furyl)-benzimidazole-1-oxide or 2-(2'-thiazolyl)-benzimidazole-1-oxide, respectively.

Example 2.—2-(3'-thienyl)-benzimidazole-1-oxide

To a solution of 13.3 grams of sodium hydrosulfide dihydrate in 130 ml. of water is added 12.1 grams of N-(o-nitrophenyl)-thiophene-3-carboxamide in 100 ml. of benzene. The reaction mixture is cooled to 10° C. and 10 grams of calcium chloride in 20 ml. of water is added. The heterogeneous mixture is stirred vigorously for 20 hours at room temperature. Ammonium chloride (10 grams) is then added and the mixture is stirred for one additional hour. The solid is filtered and washed with two 10 ml. portions of water and then with two 5 ml. portions of benzene. The crude product is recrystallized from ethanol giving substantially pure 2-(3'-thienyl)-benzimidazole-1-oxide.

When N-(o-nitrophenyl)-pyrrole-2-carboxamide or N-(o-nitro-5-methylphenyl)-3-thiophene carboxamide is used in place of N-(o-nitrophenyl)-thiophene-3-carboxamide in the above process, there is obtained 2-(2'-pyrryl)-benzimidazole-1-oxide or 2-(3'-thienyl)-5-methyl-benzimidazole-1-oxide, respectively.

Example 3

Methods for preparing some of the starting materials of this invention are known in the art and all the carboxanilide and carboxamide starting compounds may be prepared by the following procedure.

To 50 ml. of dry toluene is added 60 grams of a compound of the formula

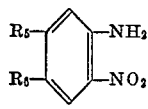

where $R_5$ and $R_6$ are hydrogen, loweralkyl, or loweralkoxy, and 10 ml. of a compound of the formula

$R_2$—COCl where $R_2$ is thienyl, furyl, pyrryl, or thiazolyl. The solution is heated at reflux for one hour. The solvent is removed under vacuum, benzene is added to the residue, then evaporated and added and evaporated once again. The remaining solid is filtered and washed with n-butanol.

The filtrate is diluted with ether to obtain a compound of the formula

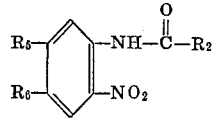

where $R_2$, $R_5$ and $R_6$ are as defined above.

Example 4.—1-methoxy-2-(4'-thiazolyl)-benzimidazole

The following procedure is intended for the purpose of disclosing methods generally applicable in preparing 1-loweralkoxy benzimidazoles from the corresponding benzimidazole-1-oxides. It is the invention of Dale R. Hoff and Meyer Sletzinger and is embraced by patent application U.S. Ser. No. 422,543, filed Dec. 31, 1964 (now abandoned) and entitled Chemical Compounds and Processes for Their Preparation.

2-(4'-thiazolyl)-benzimidazole-1-oxide (0.651 g.) is added to a solution of 0.12 g. of sodium hydroxide in 6 ml. of methanol. To the clear solution is added 0.465 g. of methyliodide and the mixture is heated at 55° C. to 60° C. for five hours. The solvent is removed in vacuo. The oily residue is diluted with 5 ml. of water and solidifies on standing. 1-methoxy-2-(4'-thiazolyl)-benzimidazole is separated by filtration, washed with water and recrystallized from (1:1) methanol-water; M.P. 117–118° C.

It should be understood that although this invention has been described with reference to particular embodiments thereof, changes and modifications may be made which are within its intended scope and it should be limited only by the language of the appended claims.

What is claimed is:

1. A process for preparing a compound of the formula

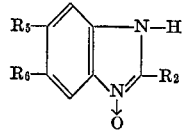

where $R_2$ is selected from the group consisting of furyl, pyrryl, thienyl, and thiazolyl; and $R_5$ and $R_6$ are selected from the group consisting of hydrogen, loweralkyl and loweralkoxy, wherein at least one of $R_5$ and $R_6$ is hydrogen which comprises treating a compound of the formula

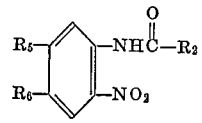

where $R_2$, $R_5$ and $R_6$ are as defined above, with a water soluble metal hydrosulfide reducing agent in a heterogeneous reaction medium comprising water, an immiscible hydrocarbon or halohydrocarbon solvent and an emulsifying agent selected from the group consisting of calcium and barium halides at a temperature below about 30° C.

2. The process of claim 1 wherein the reducing agent is an alkali metal hydrosulfide.

3. The process of claim 1 wherein the reducing agent is selected from the group consisting of sodium hydrosulfide, potassium hydrosulfide, and ammonium hydrosulfide and the emulsifying agent is selected from the group consisting of calcium chloride and barium chloride.

4. A process for preparing 2-(4'-thiazolyl)-benzimidazole-1-oxide which comprises treating N-(o-nitrophenyl)-thiazole-4-carboxamide with sodium hydrosulfide in a heterogeneous system comprising methylene chloride and water below about 30° C. in the presence of calcium chloride.

References Cited

UNITED STATES PATENTS

| | | | |
|---|---|---|---|
| 2,500,131 | 3/1950 | Linsker | 260—279 |
| 2,518,130 | 8/1950 | Evans et al. | 260—250 |
| 3,017,415 | 1/1962 | Sarett et al. | 260—302 |
| 3,155,571 | 11/1964 | Sarett et al. | 167—53 |

OTHER REFERENCES

Culvenor: Revs. Pure App. Chem., vol. 3 (1953), pp. 83–6.

Takahashi et al.: Chem. Pharm. Bull., vol. 11 (1963), pp. 1375–81.

NICHOLAS S. RIZZO, *Primary Examiner.*

R. J. GALLAGHER, *Assistant Examiner.*